(12) United States Patent
Teshima et al.

(10) Patent No.: US 9,891,327 B2
(45) Date of Patent: Feb. 13, 2018

(54) STRUCTURE, METHOD FOR MANUFACTURING THE SAME, AND IMAGE PICKUP APPARATUS INCLUDING THE STRUCTURE

(75) Inventors: Takayuki Teshima, Yokohama (JP); Yutaka Setomoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 303 days.

(21) Appl. No.: 14/235,002

(22) PCT Filed: Jul. 11, 2012

(86) PCT No.: PCT/JP2012/004476
§ 371 (c)(1),
(2), (4) Date: Jan. 24, 2014

(87) PCT Pub. No.: WO2013/024562
PCT Pub. Date: Feb. 21, 2013

(65) Prior Publication Data
US 2014/0145080 A1    May 29, 2014

(30) Foreign Application Priority Data

Jul. 29, 2011 (JP) .................. 2011-166966
May 9, 2012 (JP) .................. 2012-107876

(51) Int. Cl.
*G21K 1/06* (2006.01)
*G01T 1/16* (2006.01)
*C23C 28/00* (2006.01)

(52) U.S. Cl.
CPC ............... *G01T 1/16* (2013.01); *C23C 28/32* (2013.01); *G21K 1/06* (2013.01); *G21K 2201/067* (2013.01)

(58) Field of Classification Search
CPC ....... A61B 6/00; G01N 23/00; G01N 2223/00
See application file for complete search history.

(56) References Cited

U.S. PATENT DOCUMENTS 6,002,202 A * 12/1999 Meyer ..................... H01J 33/04
313/420
7,639,786 B2 * 12/2009 Baumann ............... A61B 6/484
378/145

(Continued)

FOREIGN PATENT DOCUMENTS

DE    102008049200 A1    4/2010
JP    S61-174546 A       8/1986

(Continued)

OTHER PUBLICATIONS

Vincent Revol, et al., X-ray interferometerwith bent gratings: Towards larger fields of view; Nuclear Instruments and Methods in Physics Research A 648 (2011) 5302-5305 vol. 648 Nov. 19, 2010.

*Primary Examiner* — Thomas R Artman
(74) *Attorney, Agent, or Firm* — Canon USA, Inc. I.P. Division

(57) ABSTRACT

The present invention relates to a method for manufacturing a structure, including the steps of forming a recessed section in a first surface of a substrate; filling the recessed section with metal to form a metal structure; exposing the metal structure from the substrate; and applying resin onto the exposed metal structure and solidifying the resin to form a resin layer.

8 Claims, 10 Drawing Sheets

(56) References Cited

U.S. PATENT DOCUMENTS

| | | | |
|---|---|---|---|
| 8,785,874 B2* | 7/2014 | Dardona | G01N 27/64 250/382 |
| 8,999,435 B2* | 4/2015 | Setomoto | B29D 11/00769 427/160 |
| 9,036,773 B2* | 5/2015 | David | A61B 6/4035 378/36 |
| 9,228,961 B2* | 1/2016 | Teshima | G01N 23/20008 |
| 2007/0183579 A1* | 8/2007 | Baumann | A61B 6/484 378/145 |
| 2011/0052800 A1* | 3/2011 | Setomoto | B29D 11/00769 427/162 |
| 2013/0000253 A1* | 1/2013 | Aberg | H01J 33/04 53/425 |
| 2013/0010926 A1* | 1/2013 | Tada | A61B 6/06 378/62 |
| 2013/0270446 A1* | 10/2013 | Dardona | G01N 27/64 250/382 |
| 2013/0279651 A1* | 10/2013 | Yokoyama | G21K 1/02 378/36 |
| 2013/0343524 A1* | 12/2013 | Teshima | G01N 23/20008 378/71 |
| 2014/0112440 A1* | 4/2014 | David | A61B 6/4035 378/62 |
| 2014/0145080 A1* | 5/2014 | Teshima | G21K 1/06 250/336.1 |
| 2014/0185779 A1* | 7/2014 | Teshima | G01N 23/04 378/145 |
| 2014/0211920 A1* | 7/2014 | Setomoto | G21K 1/025 378/70 |

FOREIGN PATENT DOCUMENTS

| | | |
|---|---|---|
| JP | S63-240502 A | 10/1988 |
| JP | 2009-037023 A | 2/2009 |
| JP | 2009-133823 A | 6/2009 |
| JP | 2010-185728 A | 8/2010 |
| JP | 2011-069818 A | 4/2011 |

* cited by examiner

[Fig. 1A]
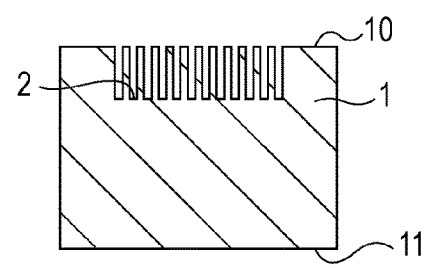
[Fig. 1B]
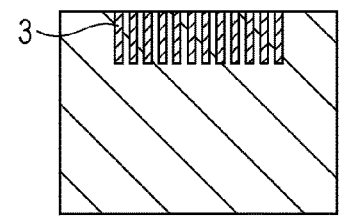
[Fig. 1C]
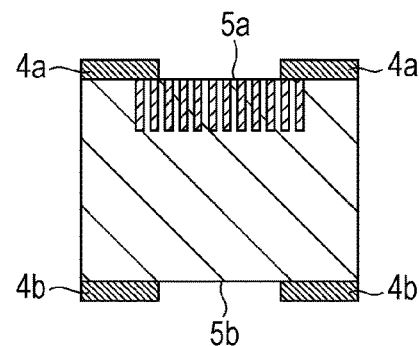
[Fig. 1D]
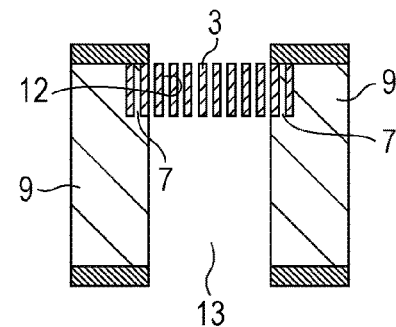
[Fig. 1E]
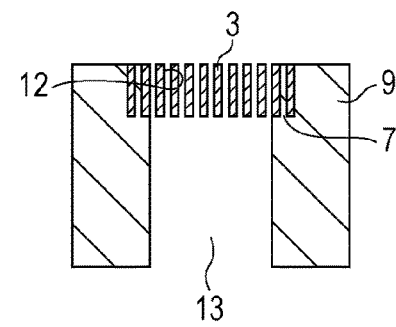

[Fig. 2A]
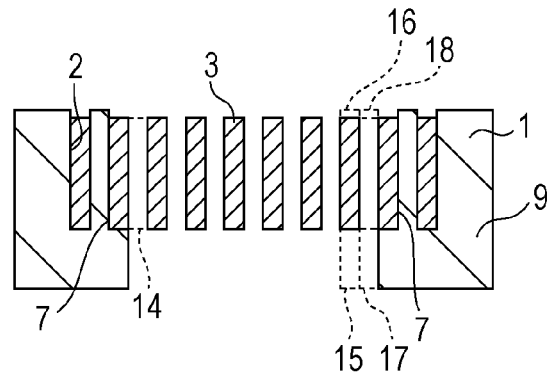
[Fig. 2B]
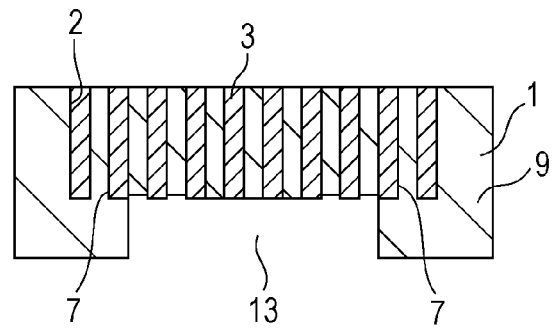
[Fig. 2C]
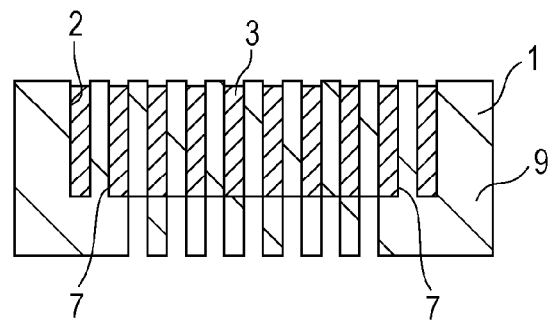
[Fig. 2D]
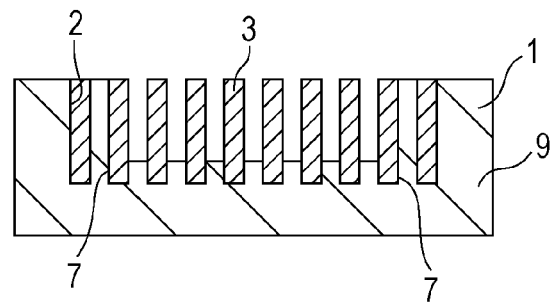

[Fig. 3A]
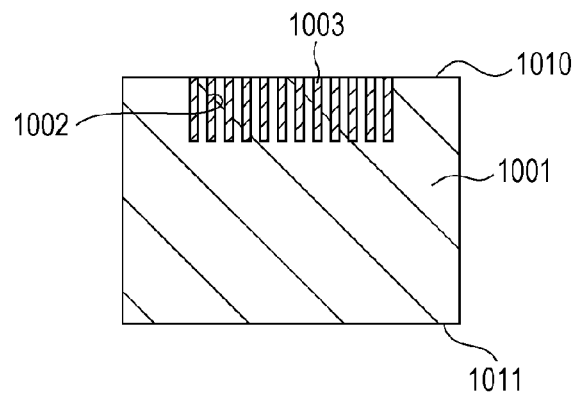
[Fig. 3B]
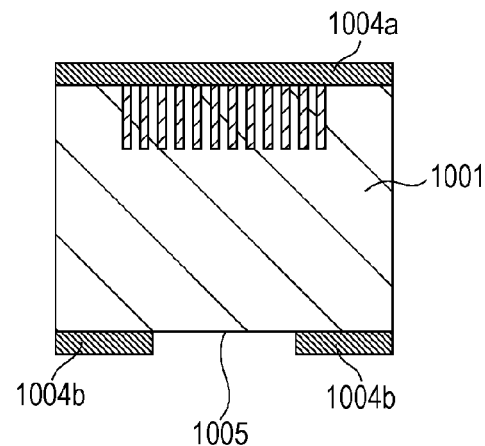
[Fig. 3C]
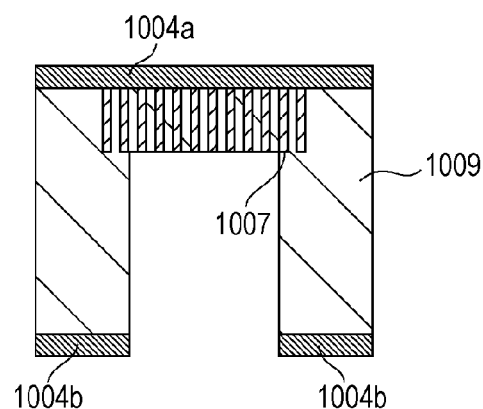
[Fig. 4A]
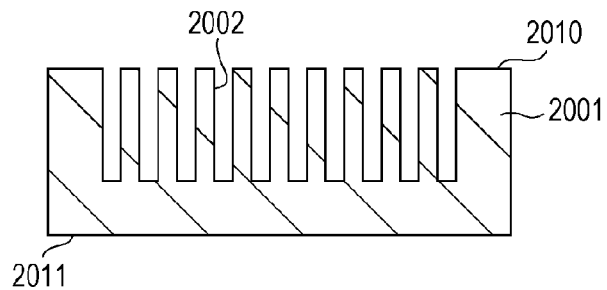

[Fig. 4B]
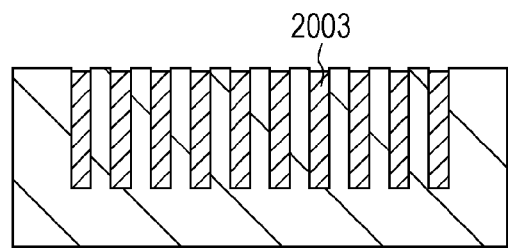
[Fig. 4C]
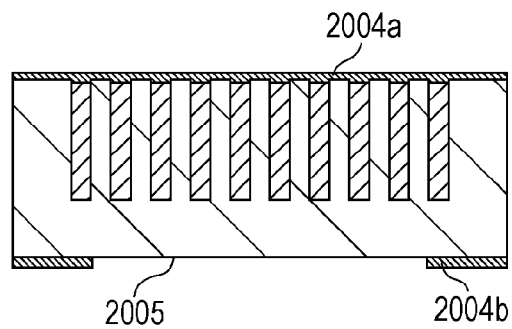
[Fig. 4D]
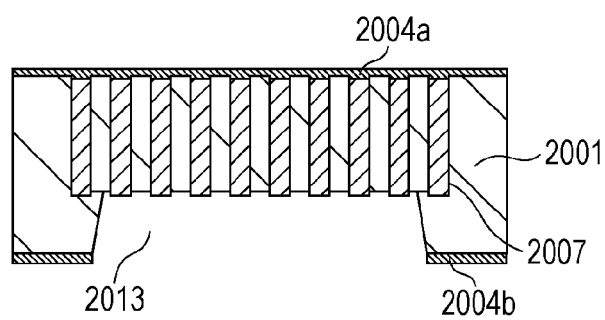
[Fig. 4E]
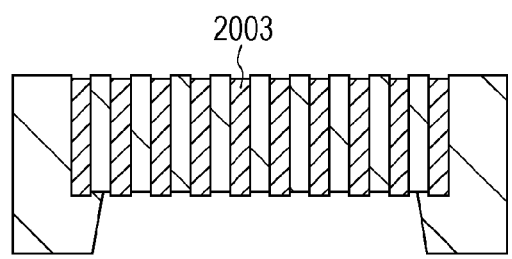
[Fig. 5A]
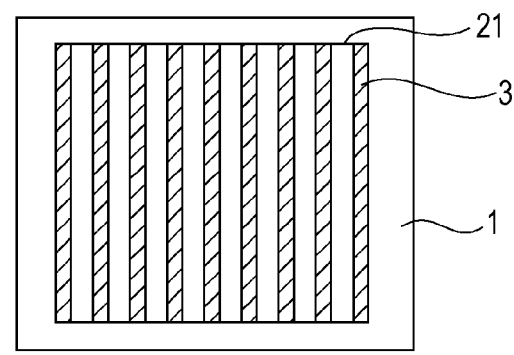

[Fig. 5B]
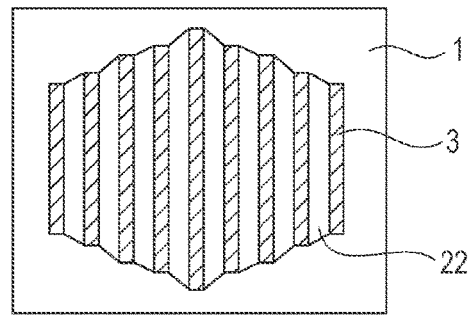
[Fig. 5C]
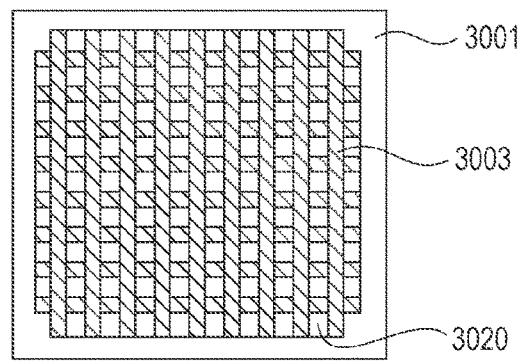
[Fig. 5D]
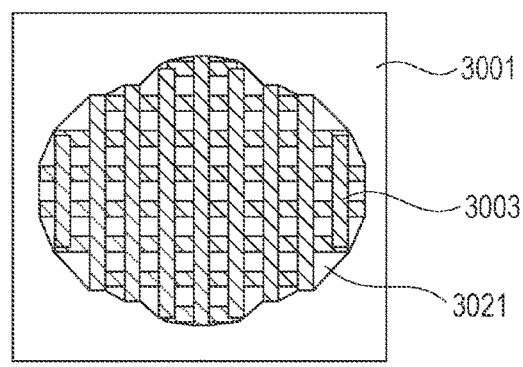
[Fig. 6A]
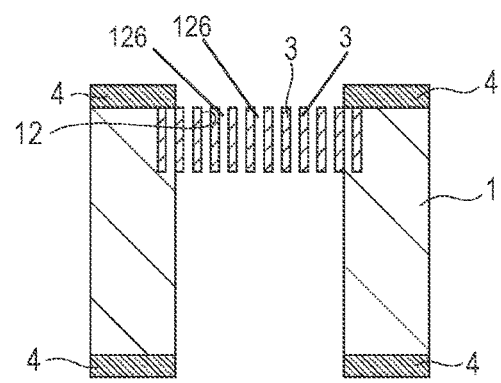

[Fig. 6B]
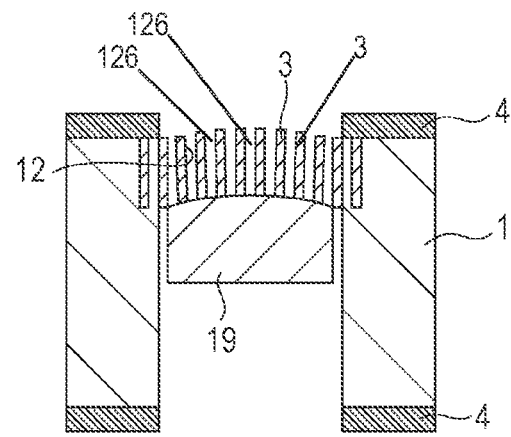
[Fig. 6C]
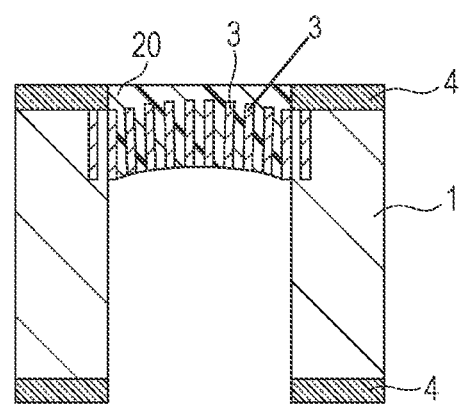
[Fig. 7A]
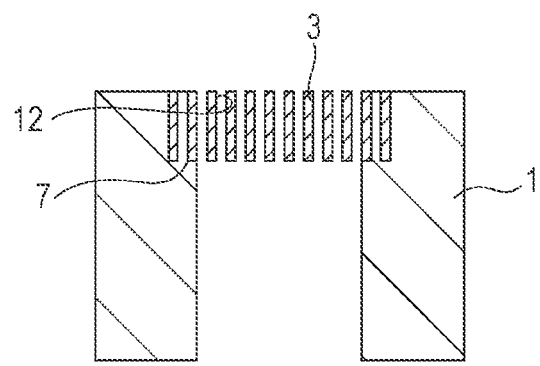

[Fig. 7B]
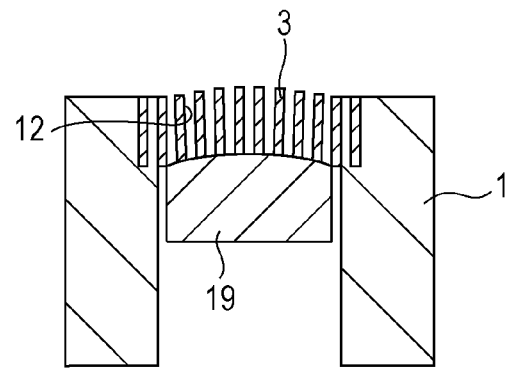
[Fig. 7C]
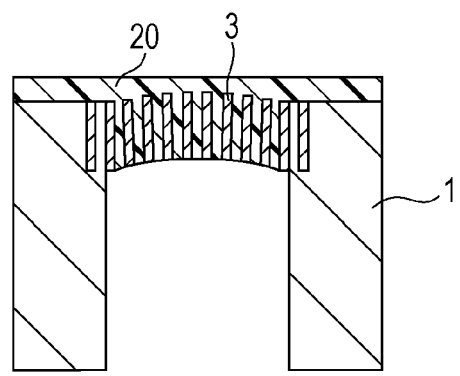
[Fig. 8A]
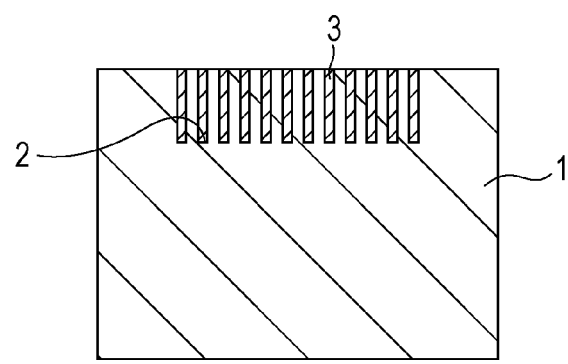
[Fig. 8B]
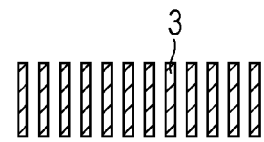

[Fig. 8C]
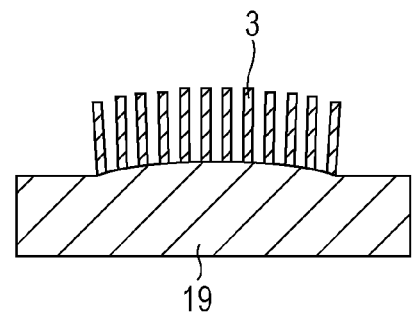
[Fig. 8D]
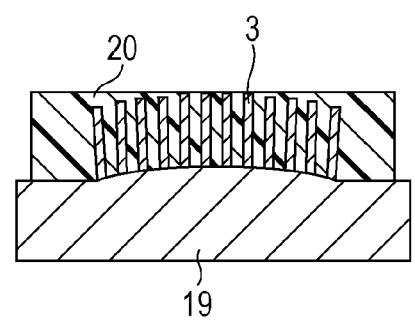
[Fig. 8E]
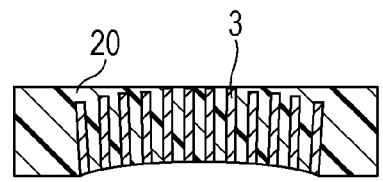
[Fig. 9A]
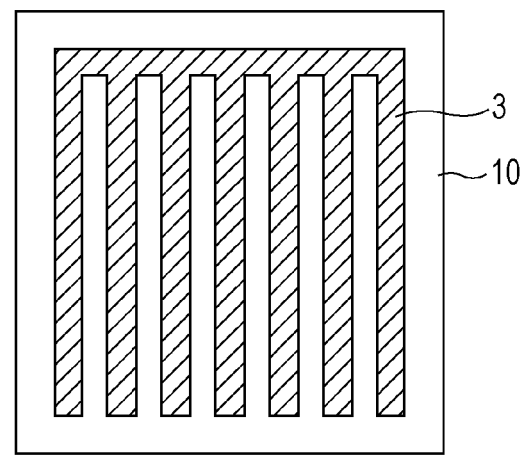

[Fig. 9B]
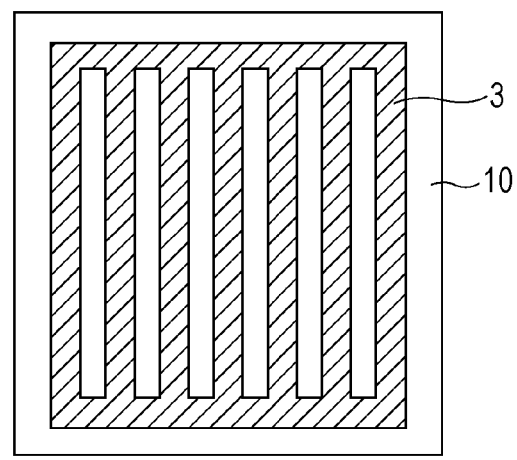

[Fig. 10]
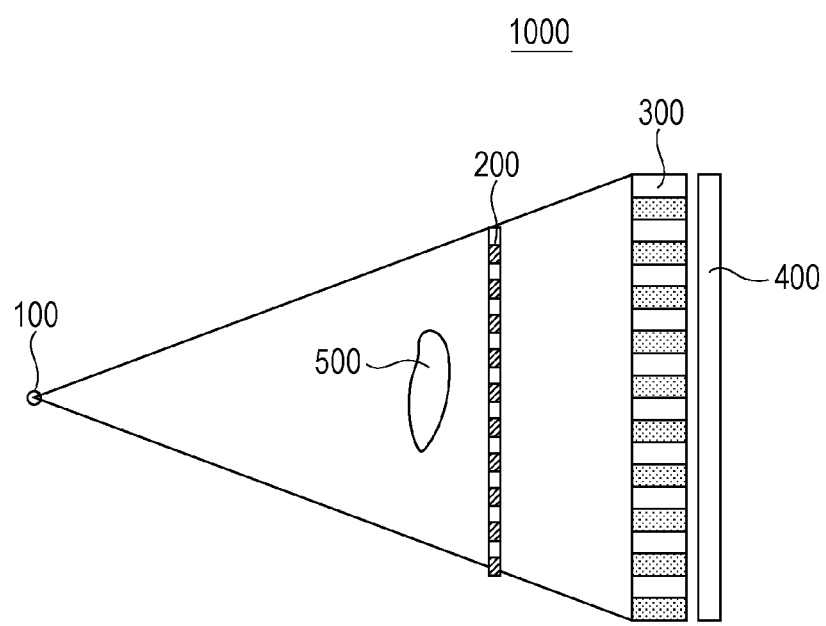

STRUCTURE, METHOD FOR MANUFACTURING THE SAME, AND IMAGE PICKUP APPARATUS INCLUDING THE STRUCTURE

TECHNICAL FIELD

The present invention relates to a structure, a method for manufacturing the same, and an image pickup apparatus including the structure, and in particular, to a structure used in an X-ray phase-contrast image pickup apparatus, a method for manufacturing the same, and an image pickup apparatus including the structure.

BACKGROUND ART

A diffraction grating having a periodic structure is used as a spectroscopic element in various apparatuses. In particular, a structure formed of metal having high X-ray absorptance is used in nondestructive inspection of an object and in the medical field.

One example of applications of the structure formed of metal having high X-ray absorptance is a shield grating (absorption grating) of an image pickup apparatus that performs imaging using Talbot interference of X-rays. An imaging method using the X-ray Talbot interference (X-ray Talbot interferometry) is one of imaging methods that use X-ray phase contrast (X-ray phase imaging).

A brief description of the X-ray Talbot interferometry will be given. In general image pickup apparatuses that perform the X-ray Talbot interferometry, spatially coherent X-rays pass an object and an X-ray diffraction grating to form an interference pattern. A shield grating that periodically blocks X-rays is placed at a position where the interference pattern is formed to form moire. The moire is detected by a detector, and an image is acquired using the detection result.

Common shield gratings used in Talbot interferometry have a structure in which X-ray transmitting portions and X-ray shield portions are periodically arranged. Many X-ray shield portions have a structure formed of metal having high X-ray absorptance, such as gold, and having a high aspect ratio (the ratio of the height or depth h of the structure to its width w (h/w)). A known method for manufacturing a shield grating whose shield portions have such a structure fills a mold with metal by soldering.

PTL 1 discloses, as a method for manufacturing a shield grating, a method of forming recessed sections in a silicon substrate by reactive ion etching and depositing metal in the recessed sections by soldering.

CITATION LIST

Patent Literature

PTL 1: Japanese Patent Laid-Open No. 2010-185728

SUMMARY OF INVENTION

Technical Problem

The transmitting portions of a shield grating manufactured by the method disclosed in PTL 1 are formed of silicon. The silicon has lower X-ray absorptance than that of metal having high X-ray absorptance, such as gold, but it is not zero, and thus the silicon absorbs X-rays. As a result, there are problems in that the contrast between the amount of transmitted X-rays that have leaked through the shield portions and the amount of X-rays that have passed through the transmitting portions (X-ray shield contrast) decreases and that the amount of X-rays that reach the detector decreases.

Accordingly, the present invention provides a structure provided with transmitting portions having higher X-ray transmittance than the conventional transmitting portions.

Solution to Problem

The present invention provides a method for manufacturing a structure, including the steps of forming a recessed section in a first surface of a substrate; filling the recessed section with metal to form a metal structure; exposing the metal structure from the substrate; and applying resin onto the exposed metal structure and solidifying the resin to form a resin layer.

Advantageous Effects of Invention

According to the present invention, a structure having transmitting portions having higher X-ray transmittance than the conventional transmitting portions can be provided.

BRIEF DESCRIPTION OF DRAWINGS

FIG. 1A is a process drawing of a first embodiment of the present invention.

FIG. 1B is a process drawing of the first embodiment of the present invention.

FIG. 1C is a process drawing of the first embodiment of the present invention.

FIG. 1D is a process drawing of the first embodiment of the present invention.

FIG. 1E is a process drawing of the first embodiment of the present invention.

FIG. 2A is a schematic cross-sectional view of a structure according to the first embodiment of the present invention.

FIG. 2B is a schematic cross-sectional view of the structure according to the first embodiment of the present invention.

FIG. 2C is a schematic cross-sectional view of the structure according to the first embodiment of the present invention.

FIG. 2D is a schematic cross-sectional view of the structure according to the first embodiment of the present invention.

FIG. 3A is a process drawing showing a method for manufacturing a structure of Example 2 of the present invention.

FIG. 3B is a process drawing showing the method for manufacturing the structure of Example 2 of the present invention.

FIG. 3C is a process drawing showing the method for manufacturing the structure of Example 2 of the present invention.

FIG. 4A is a process drawing showing a method for manufacturing a structure of Example 3 of the present invention.

FIG. 4B is a process drawing showing the method for manufacturing the structure of Example 3 of the present invention.

FIG. 4C is a process drawing showing the method for manufacturing the structure of Example 3 of the present invention.

FIG. 4D is a process drawing showing the method for manufacturing the structure of Example 3 of the present invention.

FIG. 4E is a process drawing showing the method for manufacturing the structure of Example 3 of the present invention.

FIG. 5A is a diagram illustrating an outer area according to the first embodiment of the present invention.

FIG. 5B is a diagram illustrating an outer area according to the first embodiment of the present invention.

FIG. 5C is a diagram illustrating an outer area according to a second embodiment of the present invention.

FIG. 5D is a diagram illustrating an outer area according to the second embodiment of the present invention.

FIG. 6A is an explanatory diagram of a third embodiment of the present invention.

FIG. 6B is an explanatory diagram of the third embodiment of the present invention.

FIG. 6C is an explanatory diagram of the third embodiment of the present invention.

FIG. 7A is an explanatory diagram of a fourth embodiment of the present invention.

FIG. 7B is an explanatory diagram of the fourth embodiment of the present invention.

FIG. 7C is an explanatory diagram of the fourth embodiment of the present invention.

FIG. 8A is an explanatory diagram of a fifth embodiment of the present invention.

FIG. 8B is an explanatory diagram of the fifth embodiment of the present invention.

FIG. 8C is an explanatory diagram of the fifth embodiment of the present invention.

FIG. 8D is an explanatory diagram of the fifth embodiment of the present invention.

FIG. 8E is an explanatory diagram of the fifth embodiment of the present invention.

FIG. 9A is a top view of the pattern of recessed sections according to the first embodiment of the present invention.

FIG. 9B is a top view of the pattern of recessed sections according to the first embodiment of the present invention.

FIG. 10 is a configuration diagram showing an image pickup apparatus according to an embodiment of the present invention.

DESCRIPTION OF EMBODIMENTS

Embodiments of the present invention will be described on the basis of the drawings.
First Embodiment In a first embodiment, a method for manufacturing a one-dimensional structure will be described on the basis of FIGS. 1A to 1E. Here, the one-dimensional structure is a structure in which a plurality of metal structures are arranged in one dimension and can be used as a one-dimensional shield grating in which X-ray shield portions and X-ray transmitting portions are arranged in one dimension.

The method for manufacturing the structure according to the first embodiment has the following processes:

(1) The process of forming recessed sections in a first surface of a substrate.

(2) The process of filling the recessed sections of the substrate with metal to from a metal structure.

(3) The process of forming a mask layer on at least one of the outer area of an area in which the metal structure is formed and a portion, of a second surface opposing the first surface, opposing the outer area.

(4) The process of etching the substrate by using the mask layer as a mask.

In this specification, forming the recessed sections by forming protruding sections (protruding structures) in the first surface of the substrate is also referred to as forming recessed sections in the first surface of the substrate.

An example of the structure manufactured by the processes (1) to (4) is a shield grating used in an image pickup apparatus that performs X-ray Talbot interferometry. The shield grating blocks X-rays incident on the X-ray shield portions and allows X-rays incident on the X-ray transmitting portions to pass through. Preferably, the X-ray shield portions can block 80% or more of incident X-rays. For example, if incident X-rays have an energy of 17.7 keV, silicon, if present in the transmitting portions, preferably has a thickness of 500 micrometers or less. If the incident X-rays have an energy of 17.7 keV, and if the shield portions are made of gold, it is preferable that the thickness of the gold be 20 micrometers or more and 200 micrometers or less. In general, the pitch of the shield grating used in an image pickup apparatus that performs X-ray Talbot interferometry is substantially set to be substantially equal to the pitch of an interference pattern formed by a phase grating. Therefore, in the case where the structure is used as a shield grating, the individual aspect ratios of the plurality of metal structures are commonly 20 or more.

The individual processes will be described.

(First Process)

First, as shown in FIG. 1A, a first process of forming a plurality of recessed sections 2 on a first surface 10 of a silicon substrate 1 will be described. In this embodiment, the plurality of recessed sections 2 are formed in the first surface 10 of the silicon substrate 1 by etching. If the structure manufactured in this embodiment is used as a shield grating, the plurality of recessed sections 2 eventually serve as the shield portions of the shield grating. Therefore, in manufacturing a one-dimensional shield grating, the etching is performed so that the recessed sections 2 are arranged in one dimension in the first surface 10 of the silicon substrate 1.

An example of a method for etching is wet etching using an alkaline solution utilizing the etching selectivity on the crystal orientation surface of silicon. Another example is dry etching using, such as ion sputtering and reactive gas plasma. Of the dry etching using reactive gas plasma, reactive ion etching (RIE) is suitable for forming recessed sections 2 having a high aspect ratio. Of the RIE, the RIE of Bosch process in which etching using $SF_6$ gas and deposition of a side-wall protection film using $C_4F_8$ gas are alternately performed is suitable for forming recessed sections 2 having a higher aspect ratio. Here, forming the recessed sections 2 in a narrow pitch to achieve a high-aspect-ratio allows a high-aspect ratio structure with a narrow pitch to be eventually manufactured.

In this embodiment, although the plurality of recessed sections 2 are formed by etching the silicon substrate 1, the plurality of recessed sections 2 may be formed by photolithography in a glass substrate on which a photoresist film is formed.

(Second Process)

Secondly, as shown in FIG. 1B, a second process of forming a plurality of metal structures 3 by filling the plurality of recessed sections 2 with metal will be described. An example of the method for filling metal is a method of placing metal on the recessed sections 2 and then melting the metal. Other examples include chemical vapor deposition (CVD), vacuum sputtering, and vacuum deposition. Another example is soldering.

A brief description of an example of the method for filling the recessed sections 2 with metal by soldering will be given. First, an insulating layer is formed in the recessed sections 2, and then the insulating layer at the bottom of the recessed sections 2 is removed to expose silicon at the bottoms of the recessed sections 2. A metal film is formed on the silicon exposed at the bottoms of the recessed sections 2 and is used as a mold. Power is applied to the mold through the silicon. This allows the recessed sections 2 to be filled with the metal. If the metal filled by the foregoing methods sticks out of the recessed sections 2, it can be removed by grinding.

In this embodiment, the metal that fills the recessed sections 2 is gold or an alloy of gold. Since gold has high X-ray absorptance, the use of gold or an alloy of gold as metal to fill the recessed sections 2 allows metal structures having high X-ray absorptance to be formed, and hence a structure having high X-ray shield contrast to be formed. Metal and an alloy of metal are relatively easily filled into the recessed sections 2.

(Third Process)

Thirdly, as shown in FIG. 1C, a third process of forming mask layers 4 (4a and 4b) in the outer area of an area of the silicon substrate 1 in which the plurality of metal structures 3 are formed (hereinafter sometimes simply referred to as an outer area) and at a portion opposing the outer area will be described. The portion opposing the outer area is a portion, of a second surface 11 opposing the first surface 10 of the silicon substrate 1, opposing the outer area. In this embodiment, the area in which the plurality of metal structures 3 are formed is an area enclosed by a line connecting the ends of the adjacent metal structures 3 together, examples of which are shown in FIGS. 5A and 5B. FIGS. 5A and 5B are diagrams of the metal structures 3 formed by filling the recessed sections 2 in the silicon substrate 1 with metal, as viewed from the first surface 10. As shown in FIG. 5A, in the case where all the metal structures 3 have the same size and the ends thereof are arranged in a line, an area 21 in which the metal structures 3 are formed is rectangular. As shown in FIG. 5B, even if the ends of the metal structures 3 are not arranged in a line, the area enclosed by a line connecting the ends of the adjacent metal structures 3 together is referred to as an area 22 in which the metal structures 3 are formed.

The outer area is a portion including the periphery of the area in which the metal structures 3 are formed. Forming the mask layer 4a on the outer area causes the mask layer 4a to be formed on at least part of at least one of the metal structures 3.

In this embodiment, the mask layers 4 are formed using photolithography and etching. A brief description of an example of a method for forming the mask layers 4 by using photolithography and etching will be given. First, the mask layers 4 are formed on the first surface 10 and the second surface 11 by using vacuum sputtering, vacuum deposition, or chemical vapor deposition (CVD). Next, the formed mask layers 4 are subjected to patterning with a photoresist so that areas etched in a fourth process, described below, are exposed from the mask layers 4, thereby removing part of the formed mask layers 4 by etching. Thus, the mask layers 4 can be formed in desired areas. Alternatively, it is also possible that the areas to be etched in the fourth process are subjected to patterning with resist layers, and after the mask layers 4 are formed, the resist layers are dissolved, and the formed mask layers 4 formed on the areas etched in the fourth process are lift off. Alternatively, a metal mask or the like may be formed by vacuum sputtering or vacuum deposition on the areas to be etched in the fourth process.

The mask layers 4 formed by the above methods may be increased in thickness by soldering so that the mask layers 4 can be physically reinforced and can be decreased in the number of pinholes.

The material of the mask layers 4 of this embodiment is selected from materials resistant to etching performed in the fourth process. If the structure is used after the mask layers 4 are eventually removed, the material of the mask layers 4 is selected from materials having etching selectivity for the metal structures 3.

For example, if an alkaline solution is used for etching silicon, gold, copper, nickel, or iron can be used as the material of the mask layers 4. If a hydrofluoric and nitric acid solution is used for etching the silicon, gold can be used as the material of the mask layers 4. However, if the silicon can be selectively etched in the fourth process, as described above, the material of the mask layers 4 is not limited thereto.

In this embodiment, although the mask layers 4 are formed on both the first surface 10 and the second surface 11, the mask layer 4 (4a or 4b) may be formed only on one of them. For example, if the mask layer 4a is formed only on the first surface 10, the first surface 10 is first etched in the fourth process, and if the mask layer 4b is formed only on the second surface 11, the second surface 11 is etched in the fourth process.

Although the outer areas in which the mask layers 4 are formed in this embodiment include the entire outer area of the area in which the metal structures 3 are formed, the mask layers 4 may be formed on at least part of the outer area.

(Fourth Process)

Fourthly, as shown in FIG. 1D, a fourth process of etching areas 5 (5a and 5b) of the silicon substrate 1 exposed from the mask layers 4 will be descried. In this embodiment, the etching is performed from both of the first surface 10 and the second surface 11. This enables the area 5a exposed from the mask layer 4a in the first surface 10 and the area 5b exposed from the mask layer 4b in the second surface 11 to be etched. The etching in the fourth process of this embodiment can be achieved by wet etching, dry etching, or both of them. A method for etching can be a method whereby the silicon in the areas 5 exposed from the mask layers 4 can be selectively etched without eroding the mask layers 4 formed in the third process. In the case of etching the silicon by a method of eroding the mask layers 4, the mask layers 4 are given a sufficient thickness so that the mask layers 4 remain until the etching ends so that the areas 5 of the silicon substrate 1 protected by the mask layers 4 are not etched.

An example of the method for selectively etching the silicon in the exposed areas 5 will be given.

For wet etching using an alkaline etching solution, examples of the alkaline etching solution include potassium hydroxide, sodium hydroxide, tetramethylammonium hydroxide, ammonium, and hydrazine. However, the alkaline etching solution that can be used in this embodiment is not limited thereto. The etching of silicon by using the alkaline etching solution enables anisotropic etching. Thus, this can suppress side etching in which the silicon in the area sandwiched between the mask layer 4a formed on the first surface 10 and the mask layer 4b formed on the second surface 11 is etched as compared with isotropic etching. This can reduce the areas in which the mask layers 4 are to be formed, and hence the area to be used as the shield grating can be increased, provided that the silicon substrates 1 of the same size are used.

For wet etching of the silicon in the exposed areas 5, a hydrofluoric and nitric acid solution can also be used. Since the hydrofluoric and nitric acid solution can etch silicon at higher speed even at a low temperature, the time required for the etching process can be reduced.

The silicon in the exposed areas 5 may also be etched by dry etching. Examples of reactive gas for use in selective dry etching of the exposed areas 5 include fluorocarbons, such as $CF_4$ and $CHF_3$. Furthermore, fluorine-containing gas, such as $SF_6$ and XeF, can also be used. However, reactive gas that can be used in this embodiment is not limited thereto.

The result of complete etching of the silicon in the areas 5 exposed from the mask layers 4 in the thickness direction is shown in FIG. 1D. Here, the thickness of the silicon substrate 1 is the length between the first surface 10 and the second surface 11, and the thickness direction is the vertical direction in FIGS. 1A to 1E. Complete etching in the thickness direction causes depressed spaces 12 formed in the first surface 10 and a recessed section 13 forming a space formed in part of the second surface 11 to communicate with each other. The communication of the depressed spaces 12 with the recessed section 13 formed in part of the second surface 11 is also referred to that the depressed spaces 12 are formed in the first surface 10. The etching in the thickness direction is not necessarily performed completely. The silicon may be left provided that desired transmittance of the X-ray transmitting portions of the structure can be achieved. The silicon removed in the fourth process preferably has one fourth or more of the thickness of the silicon substrate 1 at the end of the third process, and more preferably, one third, and still more preferably, one half or more. The silicon substrate 1 present under the metal structures 3 does not need to be necessarily be etched. Leaving the silicon substrate 1 in the same pattern as that of the metal structures 3 would allow the remaining silicon to support the metal structures 3, thus making the structure 6 stronger. Leaving part of the silicon substrate 1 in a pattern with the same width as that of the metal structures 3 allows the remaining silicon to act as an X-ray absorber, depending on the height of the metal structures 3, thus improving the X-ray shield contrast of the structure. Here, the thickness direction of the silicon substrate 1 is the heightwise direction of the metal structures 3.

In this embodiment, part of the silicon substrate 1 is left by using the mask layer 4a formed in the outer area of the area in which the metal structures 3 are formed and the mask layer 4b formed in part of the second surface 11 opposing the outer area. The part of the silicon substrate 1 left by the etching is referred to as a supporting member 9, and the portion of the supporting member 9 connected to the metal structures 3 is referred to as a supporting portion 7. Since the individual metal structures 3 are supported by the supporting portion 7 and the mask layer 4a, they are not separated from the supporting member 9.

As shown in FIG. 1E, the process of removing the mask layers 4 may be performed after the fourth process. Since the metal structures 3 are supported by the silicon of the supporting portion 7 even if the mask layer 4a is removed, the metal structures 3 are not separated from the supporting member 9.

In the case where the recessed sections 2 are independent from each other, as in this embodiment, the metal structures 3, which are formed in the recessed sections 2, are also independent from each other. Thus, the metal structures 3 need to be supported by the supporting portion 7 so that the orientation of the array of the metal structures 3 can be maintained.

Therefore, if the area in which the metal structures 3 are formed is rectangular, the supporting portion 7 needs to be formed, at least in the orientation of the array of the metal structures 3, in the area in which the metal structures 3 are formed. This is achieved by forming the mask layer 4 in the outer area (or a portion opposing the outer area) including, of the outer area of the area in which the metal structures 3 are formed, at least one of two sides parallel to the orientation of the array of the metal structures 3, and thereafter etching the silicon in the fourth process. Note that the larger the outer area of the area in which the metal structures 3 are formed, the more the outer area in which the mask layer 4 can securely hold the array of the metal structures 3. Therefore, of the outer area of the area in which the metal structures 3 are formed, the mask layer 4 is formed in the outer area including the two sides parallel to the orientation of the array of the metal structures 3. Furthermore, the mask layer 4 may be formed in an outer area including the entire outer area (four sides) of the area in which the metal structures 3 are formed.

Even if the recessed sections 2 communicate with each other, as shown in FIGS. 9A and 9B, a one-dimensional structure that can be used as a one-dimensional shield grating can be manufactured. FIGS. 9A and 9B are diagrams of the metal structures 3 formed by filling the recessed sections 2 with metal, as viewed from the first surface 10. In FIG. 9A, the metal structures 3 arranged in one dimension communicate at one end in the direction parallel to the orientation of the array. The metal structures 3 can be formed by communicating the recessed sections 2 at one end in the direction parallel to the orientation of the array. In FIG. 9B, the metal structures 3 arranged in one dimension communicate at both end in the direction parallel to the orientation of the array. The metal structures 3 can be formed by communicating the recessed sections 2 at both ends in the direction parallel to the orientation of the array. In this specification, the recessed sections 2 communicating with each other are also regarded as a plurality of recessed sections, and the structure shown in FIG. 9A and 9B are regarded as a structure in which the plurality of metal structures 3 are formed on the silicon substrate 1. In the case where the metal structures 3 communicate with each other, as shown in FIG. 9A and 9B, the orientation of the array of the metal structures 3 in the silicon substrate 1 can be maintained without the supporting portion 7 in the orientation of the array of the metal structures 3, as described above. In the case where the metal structures 3 communicate with each other, the structure can be used as a one-dimensional shield grating by using the area in which the metal structures 3 are arranged in one dimension without using the communicating area.

Examples of the structure obtained by the manufacturing method of this embodiment are shown in FIGS. 2A to 2C. The structure manufactured in this embodiment includes the supporting member 9, which is part of the silicon substrate 1, and the metal structures 3. The metal structures 3 are supported on the supporting member 9 by the supporting portion 7 of the supporting member 9 or by the supporting portion 7 and the mask layers 4.

A case in which the structure according to this embodiment is used as a shield grating of an image pickup apparatus that performs X-ray Talbot interferometry will be described using FIG. 2A. The structure in FIG. 2A has a configuration in which the supporting member 9, which is part of the silicon substrate 1, is shaped like a frame that supports the metal structures 3. When the structure in FIG. 2A is used as a shield grating, X-ray shield portions are formed of the metal structures 3 and at least one of silicon or space present at portions 15 and 16 present below and above the individual metal structures 3, respectively. X-ray transmitting portions are formed of portions 14 sandwiched between the metal structures 3 and at least one of silicon and space present at portions 17 and 18 present below and above the portions 14. As shown in FIG. 2A, when the silicon exposed from the mask layers 4 is completely removed in the thickness direction, the X-ray shield portions are formed of the metal structures 3 and spaces below the metal structures 3, and the X-ray transmitting portions are formed of the spaces sandwiched between the metal structures 3 and spaces above and below the spaces. Here, the spaces sandwiched between the metal structures 3 are the depressed spaces 12 described above. The portions 15 below the metal structures 3 are portions that are extended from the bottoms of the metal structures 3 adjacent to the second surface 11 to intersections with the extension of the second surface 11 of the supporting member 9. The portions 16 above the metal structures 3 are portions that are extended from the bottoms of the metal structures 3 adjacent to the first surface 10 to intersections with the extension of the first surface 10 of the supporting member 9.

Similarly, the portions 17 below the portions 14 sandwiched between the metal structures 3 are portions that are extended from the bottoms of the metal structures 3 adjacent to the second surface 11 to intersections with the extension of the second surface 11 of the supporting member 9. The portions 18 above the portions 14 sandwiched between the metal structures 3 are portions that are extended from the bottoms of the metal structures 3 adjacent to the first surface 10 to intersections with the extension of the first surface 10 of the supporting member 9.

In manufacturing the structure of this embodiment, the thickness of the silicon substrate 1 to be removed in the etching in the fourth process can be reduced by using a thinner silicon substrate. However, the decrease in the thickness of the silicon substrate 1 decreases the thickness of the supporting member 9, thus decreasing the mechanical strength. Therefore, the silicon substrate 1 used is, for example, of four-inch wafer size, 300 micrometers to 525 micrometers in thickness.

The structure of this embodiment is configured such that the silicon present in the X-ray transmitting portions is smaller in thickness than the silicon of the supporting member 9. Therefore, using this structure as a shield grating makes it easier to transmit X-rays than the transmitting portions of the conventional shield grating and can reduce scattering in the silicon. The small thickness of the silicon in this embodiment includes that the thickness of the silicon of the supporting member 9 is not zero and that the thickness of silicon present in the X-ray transmitting portions is zero.

FIG. 2B shows a structure in which the recessed section 13 that forms space is provided in part of the second surface 11 of the silicon substrate 1, and silicon is left in the portions sandwiched between the metal structures 3. Thus, the X-ray transmitting portions are formed of the silicon and the space. Since the recessed section 13 that forms the space is provided, the thickness of the silicon present in the X-ray transmitting portions is smaller than that of the silicon of the supporting member 9. The structure shown in FIG. 2A can improve the X-ray transmittance of the X-ray transmitting portions as a shield grating. However, the structure shown in FIG. 2B has an advantage in that, by leaving the silicon in the portions sandwiched between the metal structures 3, the silicon serves as a spacer, thus securely holding the pitch between the metal structures 3.

FIG. 2C shows a structure in which the silicon at the portions below the portions sandwiched between the metal structures 3 is deeply patterned, and the silicon below the metal structures 3 is selectively left. This allows the silicon below the metal structures 3 to act as an X-ray absorber. The deeply etched portion allows X-rays to easily pass through, thus having the advantage of enhancing the X-ray shield contrast.

FIG. 2D shows a structure in which the mask layer 4 is formed only on the first surface 10, and etching is performed only from the first surface 10. Even if etching is performed only from the first surface 10, the structure shown in FIG. 2A can be provided by completely etching the area exposed from mask layer 4. Instead, as shown in FIG. 2D, only the portions sandwiched between the metal structures 3 may be removed by etching. The use of the structure shown in FIG. 2D as a shield grating also achieves higher X-ray transmittance of the transmitting portions than that of the conventional shield grating. In the structure in which part of the portions sandwiched between the metal structures 3 remains, as in FIG. 2D, part of the portions sandwiched between the metal structures 3 forms depressed spaces in the first surface 10. If the silicon of the portions sandwiched between the metal structures 3 is completely removed, all of the portions sandwiched between the metal structures 3 form depressed spaces in the first surface 10.

In the case where the structure manufactured in this embodiment is used as a shield grating of an image pickup apparatus that performs X-ray Talbot interferometry, the pitch between the metal structures 3 is preferably set at 8 micrometers or less.

Second Embodiment

In a second embodiment, a method for manufacturing a two-dimensional structure will be described. Descriptions of overlaps with the first embodiment will be omitted.

The two-dimensional structure is a metal structure in which a plurality of holes are arranged in a metal structure, and the holes are arranged in two dimensions. The two-dimensional structure can be used as a two-dimensional shield grating in which X-ray shield portions and X-ray transmitting portions are arranged in two dimensions. When the two-dimensional structure is used as a two-dimensional shield grating, the plurality of holes provided in the metal structure function as X-ray transmitting portions, and thus, the aspect ratio of each hole is commonly 20 or more.

(First Process)

As in the first embodiment, first, a recessed section is formed in the first surface of the silicon substrate 1. Note that the recessed section formed in this embodiment is one recessed section having plurality of holes in the recessed section. By forming such a recessed section, a plurality of protruding sections are formed in the first surface of the silicon substrate 1. When the structure is used as a shield grating, the recessed section eventually functions as a shield portion of the shield grating, as in the first embodiment. When this metal structure is formed, the protruding sections serve as the plurality of holes in the metal structure, and when used as a shield grating, the plurality of protruding sections serve as transmitting portions, and thus, etching is performed so that the protruding sections are arranged in two dimensions in the first surface of the silicon substrate.

As in the first embodiment, the protruding sections may be formed on a glass substrate on which a photoresist film is formed by using photolithography, instead of the silicon substrate.

(Second Process)

Secondly, the space between the protruding sections formed in the first process are filled with metal to form a metal structure. The space between the protruding sections is one recessed section formed in the first process. The second embodiment differs from the first embodiment in that there is one recessed section, and thus, one metal structure is formed.

(Third Process)

Thirdly, as in the first embodiment, mask layers are formed in the outer area of the area in which the metal structure formed in the second process is formed and at a portion opposing the outer area. In this embodiment, the area in which the metal structure is formed is an area enclosed by a line connecting the ends of the metal structure together, like the area in which the plurality of metal structures 3 are formed in the first embodiment, examples of which are shown in FIGS. 5C and 5D. As in FIGS. 5A and 5B, FIGS. 5C and 5D are diagrams of a metal structure 3003 formed by filling recessed sections formed in a silicon substrate 3001 with metal, as viewed from the first surface. As shown in FIG. 5C, when the ends of the metal structures 3003 are arranged in a line, an area 3020 in which the metal structures 3003 are formed is a rectangle 4 without four corners. As shown in FIG. 5D, also when the ends of the metal structures 3003 are not arranged in a line, the area enclosed by a line connecting the adjacent metal structures 3003 is referred to as an area 3021 in which the metal structures 3003 are formed.

The outer area is a portion including the periphery of the area in which the metal structures 3003 are formed. Forming the mask layer in the outer area forms the mask layer at least part of the metal structures 3003.

Also in this embodiment, although mask layers are formed on both of the first surface and the second surface, as in the first embodiment, the mask layer may be formed only on one of the surfaces.

(Fourth Process)

Fourthly, as in the first embodiment, the silicon of the areas exposed from the mask layers formed in the third process is etched. The method for etching is the same as that of the first embodiment. The silicon of the areas exposed from the mask layers may be etched either completely or partly in the thickness direction, as in the first embodiment. Complete etching in the thickness direction removes the protruding sections of the silicon substrate and portions opposing the protruding sections, thus connecting the depressed space formed in the first surface with the recessed section that forms a space formed at part of the second surface. Of the depressed space and the recessed section that forms the space, spaces present in the metal structure are the holes of the metal structure. If the protruding sections of the silicon substrate remain in the metal structure, the holes in the metal structure have silicon. That is, the holes in the metal structure may either be spaces or partly or wholly have silicon. The holes may be formed of a material other than silicon provided that it has higher X-ray transmittance than the material of the metal structure. In the case where the structure manufactured in this embodiment is used as a shield grating, the holes in the metal structure function as transmitting portions. Therefore, a material having high X-ray transmittance is used for the holes.

Also in this embodiment, since the supporting member, which is part of the silicon substrate, remains by performing etching after forming the mask layers, and the metal structure is supported on the supporting member by the supporting portion and the mask layers, the metal structure is not separated from the supporting member.

Even if the process of removing the mask layers is performed after the fourth process, the metal structure is not separated from the supporting member, as in the first embodiment.

In this embodiment, one metal structure is formed. Accordingly, even if a plurality of metal structures are not supported by the supporting portion, as in the first embodiment, the orientation of the array of the metal structure can be maintained. Here, the orientation of the array of the metal structure is the orientation of the array of the holes provided in the metal structure. The metal structure may be supported by the supporting member to reinforce the strength of the metal structure. Since the larger the supporting portion of the supporting member, the more it can reinforce the strength, the outer area in which the mask layer is formed may include much of the periphery of the area in which the metal structure is formed. Thus, the outer area in which the mask layer is formed preferably includes one fourth or more of the periphery of the area in which the metal structure is formed, and more preferably includes one half or more of the periphery of the area in which the metal structure is formed. Furthermore, the outer area in which the mask layer is formed preferably includes four fifths or more of the periphery of the area in which the metal structure is formed, and more preferably, includes the entire periphery of the area in which the metal structure is formed.

As in the first embodiment, the structure of this embodiment is configured such that the silicon present in the X-ray transmitting portions is smaller in thickness than the silicon of the supporting member. Therefore, using this structure as a shield grating makes it easier to transmit X-rays than the transmitting portions of the conventional shield grating and can reduce scattering in the silicon.

Third Embodiment

In a third embodiment, a method for manufacturing a two-dimensional structure whose strength is increased using resin will be described on the basis of FIGS. 6A to 6C. In this embodiment, a resin layer is formed after deforming a metal structure into a curved shape to manufacture a structure having a desirable shape as a shield grating for X-rays emitted from a point source (an X-ray source having a small X-ray generation area).

In this embodiment, since the processes to the fourth process are the same as those of the second embodiment, the details will be omitted. The two-dimensional structure of this embodiment can also be used as a two-dimensional shield grating.

(First Process)

First, a recessed section having a plurality of holes is formed in the first surface of the silicon substrate, as in the second embodiment. By forming such a recessed section, a plurality of protruding sections are formed in the first surface of the silicon substrate. The protruding sections become a plurality of holes in the metal structure when the recessed section is filled with metal to form the metal structure in the following process. In the case where the structure is used as a shield grating, the recessed section finally functions as a shield portion of the shield grating, as in the second embodiment. Since the protruding sections serve as transmitting portions, etching is performed so that the protruding sections are arranged in two dimensions in the first surface of the silicon substrate.

(Second Process)

Secondly, the recessed section (spaces between the protruding sections) formed in the first process is filled with metal to form a metal structure.

(Third Process)

Thirdly, as in the second embodiment, mask layers are formed in the outer area of the area in which the metal structure formed in the second process is formed and at a portion opposing the outer area. The area in which the metal structure is formed in this embodiment is the same as the area in which the metal structure is formed in the second embodiment.

(Fourth Process)

Fourthly, the silicon of the areas exposed from the mask layers formed in the third process is etched. The method for etching is the same as that of the second embodiment. The silicon of the area exposed from the mask layers may be etched either completely or partly in the thickness direction, as in the second embodiment. Here, half or more of the height of the metal structure may be exposed from the silicon substrate to increase the X-ray transmittance as compared with the conventional transmitting portions formed of silicon while increasing the strength of the structure as compared with that of the second embodiment by covering the surface of the metal structure with resin. Furthermore, as shown in FIG. 6A, the entire height of the metal structure 3 may be exposed from the silicon substrate. That is, in the case of a metal structure with a height of 100 micrometers, 50 micrometers or more is preferably exposed from the silicon substrate, and more preferably, the entire height of 100 micrometers is exposed. Exposing half or more of the metal structure 3 from the silicon substrate causes half or more of the holes 126 of the metal structure 3 to be formed of space. In this embodiment, as shown in FIG. 6A, since etching is performed until the depressed space formed in the first surface and the recessed section formed in part of the second surface are connected, the holes 126 in the metal structure 3 are formed of space. The holes 126 in the metal structure 3 are not necessarily formed of only space and may be formed of either silicon (the material of the substrate) or silicon and space. If silicon forms at least part of the holes, it is referred to as that the holes have silicon.

Also in this embodiment, since the supporting member, which is part of the silicon substrate, remains by performing etching after forming the mask layer, and the metal structure is supported on the supporting member by the supporting portion and the mask layers, the metal structure is not separated from the supporting member.

(Fifth Process)

Fifthly, resin is applied to the surface of the metal structure exposed from the silicon substrate in the fourth process and is solidified to form a resin layer. The resin layer improves the strength of the structure, in particular, the metal structure, as compared with the structure (metal structure) of the second embodiment. Furthermore, in this embodiment, the resin layer is formed, with the metal structure deformed, to manufacture a structure in a desired shape as a shield grating for X-rays emitted from a point source, as described above. An example of a method for deforming the metal structure deforms the metal structure 3 by using a form 19 into a shape reflecting the shape of the form 19, as shown in FIG. 6B. In this embodiment, the form 19 having a three-dimensional shape is used. The form 19 may be a convex form or a concave form. An example of a method for deforming the metal structure 3 using the form 19 includes applying external pressure to the form 19, with the form 19 in contact with the metal structure 3. For example, by bringing the metal structure 3 into contact with the convex form 19 and pushing the concave form 19 against the metal structure 3, the metal structure 3 can be deformed. Another example is placing liquid between the metal structure 3 and the form 19 and sticking the metal structure 3 to the form 19 using surface tension. In the specification, also the case where the metal structure and the form are not in direct contact with each other and only in indirect contact is referred to that the metal structure and the form are in contact.

Next, resin is applied so as to cover the deformed metal structure 3, and the resin is solidified to form a resin layer 20. Thus, a structure in which the holes in the metal structure 3 are filled with resin can be obtained. The resin may be either synthetic resin or natural resin. Resin with high X-ray transmittance is used; X-ray transmittance higher than that of silicon is used. The resin that fills the holes in the metal structure 3 may have void. The resin may fill only half of the height of the holes. By forming the resin layer 20, with the metal structure 3 deformed using the form 19, the metal structure 3 is formed into a shape reflecting the shape of the form 19 (FIG. 6C). Furthermore, since at least part of the holes in the metal structure 3 is filled with resin to form the resin layer 20, the strength of the metal structure 3 can be increased. Note that all of the holes are not necessarily be filled with the resin layer 20.

The resin layer 20 may also be formed by applying resin to the metal structure 3, then deforming the metal structure 3, and thereafter solidifying the resin.

Using an R-shaped form allows the metal structure 3 having a plurality of holes with a high aspect ratio to be formed in a desired R-shape. The R-shape in this specification is a shape in which a cylinder is cut in the axial direction. The heightwise orientation of the holes in the R-shaped metal structure 3 (aligned with the heightwise direction of the metal structure 3) also reflects the R-shape. Deforming the metal structure 3 along part of the surface of a ball by using a form having a sag surface shape causes the extensions of the holes in the heightwise direction to intersect, thus allowing the ex-tensions to focus on one point, if errors ignored. To use the structure as a shield grating for X-rays diverging in two dimensions from a point source, the metal structure 3 is deformed to a shape taken along part of the surface of a ball. This is because a flat X-ray shield grating causes the advancing direction of X-rays and the orientation of the extensions of the X-ray transmitting portions of the shield grating to be shifted with an increasing distance from the X-ray source, resulting in insufficient X-ray transmission contrast or decreasing the amount of X-rays that reach the detector. Deforming the metal structure 3 into a shape taken along part of the surface of a ball allows the extensions of the holes serving as X-ray transmitting portions to be focused on one point, thus reducing misalignment of the advancing direction of the X-rays and the orientation of the extensions of the X-ray transmitting portions. If X-rays that diverge in one direction, like so-called fan beams, the same advantages can be given even with the metal structure deformed in an R-shape.

In this embodiment, although the resin layer is formed after deforming the metal structure, the metal structure is not necessarily deformed and may be, for example, in a flat shape, depending on the size of the light source (X-ray source), the size of the irradiation area, the size of the metal structure, and so on. In this case, as shown in FIG. 6A, forming the resin layer, with the metal structure exposed from the silicon and not be deformed, allows at least part of the holes in the metal structure to be filled with resin having higher X-ray transmittance than that of the silicon. This enables a structure having higher X-ray shield contrast than the structure in which the transmitting portions are formed of silicon, as disclosed in PTL 1, and having higher strength than that of the structure in the second embodiment.

Fourth Embodiment

In a fourth embodiment, a method for manufacturing a two-dimensional structure whose strength is increased using resin will be described on the basis of FIGS. 7A to 7C. This embodiment differs from the third embodiment in that the mask layers 4 are removed, as shown in FIG. 7A. Since the metal structure 3 is supported by the silicon of the supporting portion 7, the metal structure 3 is not separated from the supporting member 9 even without the mask layers 4. In this embodiment, the processes to the fourth process in the third embodiment are performed in the same way as that of the third embodiment, and thereafter, the mask layers 4 are removed.

Next, as in the third embodiment, the metal structure 3 is brought into contact with the form 19 to deform the metal structure 3 into a shape reflecting the shape of the form 19 (FIG. 7B). Next, resin is applied to the deformed metal structure 3 and is solidified to form the resin layer 20. Thus, the metal structure 3 is shaped into the shape reflecting the shape of the form 19 used (FIG. 7C).

Fifth Embodiment

In a fifth embodiment, a method for manufacturing a structure whose strength is increased by applying resin to a metal structure taken out of a silicon substrate to form a resin layer will be described on the basis of FIGS. 8A to 8E. In this embodiment, a two-dimensional structure that can be used as a two-dimensional shield grating will be described, and duplicates with the second embodiment will be omitted. First, the recessed section 2 is filled with metal to form the metal structure 3 by the same method as in the second embodiment (FIG. 8A). Next, the metal structure 3 is taken out of the silicon substrate 1 to expose the metal structure 3 (FIG. 8B). The metal structure 3 may be taken out by, for example, a method of leaving the metal structure 3 by melting the silicon substrate 1 by etching or a method of taking the metal structure 3 out from the silicon substrate 1 by cutting in the silicon substrate 1. Any of etching methods, wet etching and dry etching, in which it is difficult to etch the metal structure 3, can be used to etch the silicon substrate 1. For wet etching, the silicon substrate 1 can be etched using a solution containing hydrofluoric acid and nitric acid. Alternatively, an inorganic alkalic solution, such as potassium hydroxide and sodium hydroxide, or an organic alkalic solution, such as tetramethylammonium hydroxide, hydrazine, and ethylenediamine, may be used. For dry etching, the silicon substrate 1 can be etched using xenon fluoride as a reactive gas. Xenon fluoride is a gas that allows silicon to be selectively etched. In this embodiment, since the metal structure 3 need only be taken out from the silicon substrate 1, the taken-out metal structure 3 may have part of the silicon substrate 1. The taken-out metal structure 3 has a plurality of holes. The holes may be either spaces or have silicon formed in part of the holes. However, in the case where the metal structure 3 is deformed in the following process, the metal structure 3 in which the proportion of the space of the holes is larger can easily be deformed. If half or more of the volumes of the holes is space, the metal structure 3 can easily be deformed, and if three fourths or more of the volumes of the holes is space, the metal structure 3 can be deformed more easily.

Next, the taken-out metal structure 3 is deformed. The method for deformation is the same as that of the third embodiment. For example, the metal structure 3 is brought into contact with the form 19, and is deformed into a shape reflecting the shape of the form 19 (FIG. 8C). The method of determination using the form 19 is also the same as that of the third embodiment.

Next, resin is applied so as to cover the deformed metal structure 3, and the resin is solidified to form the resin layer 20. Thus, the taken-out metal structure 3 is formed into a shape reflecting the shape of the form 19 used (FIG. 8D). The resin layer 20 may also be formed by applying resin to the metal structure 3 taken out from the silicon substrate 1, then deforming the metal structure 3, and solidifying the resin. When the metal structure 3 is separated from the form 19, a structure equipped with the metal structure 3 having a shape reflecting the shape of the form 19 and the resin layer 20 is formed (FIG. 8E). The resin layer 20 is formed in part or all of the holes in the metal structure 3. Note that all of the holes are not necessarily be filled with the resin layer 20.

As in the third embodiment, forming the metal structure 3 in an R-shape causes the depthwise orientation of the plurality of depressed spaces 12 to reflect the R-shape. Deforming the metal structure 3 to a shape taken along part of the surface of a ball causes the extensions of the holes in the heightwise direction to intersect, thus allowing the extensions to focus on one point, if errors ignored.

Although the metal structure 3 formed on the supporting portion 7 of the fourth embodiment cannot easily be deformed because it overlaps with the silicon substrate 1, the manufacturing method of this embodiment enables the metal structure 3 to be deformed to its ends because it has no supporting portion. This has the advantage of increasing the effective area used as the X-ray shield grating. Furthermore, the metal structure 3 can be deformed more because the metal structure 3 is not connected to the supporting portion 7.

In this embodiment, although the resin layer 20 is formed, with the metal structure 3 deformed, as in the third embodiment, the resin layer 20 may be formed, without the metal structure 3 deformed. This allows the resin layer 20 formed of resin having higher X-ray transmittance than silicon to be formed in at least part of the individual holes of the metal structure 3. Thus, a structure equipped with a metal structure having a plurality of holes and a resin layer, the holes each having a resin layer, is formed. This structure can be used as an X-ray shield grating having an X-ray transmitting portion having higher X-ray transmittance than the conventional X-ray transmitting portion formed of silicon and having higher strength than an X-ray shield grating formed of only a metal structure.

EXAMPLES

This embodiment will be described in more detail using specific examples.

Example 1

In Example 1, a two-dimensional structure is manufactured by forming mask layers from copper on the first surface and the second surface and performing etching using an alkalic solution.

In this example, a both-side mirror-finished silicon substrate with a diameter of 100 millimeters (four inches) and a thickness of 525 micrometers is used. First, a first surface of the silicon substrate is etched to form a plurality of protruding sections (first process). The protruding sections are formed as follows: A silicon dioxide layer having a thickness of about 0.5 micrometers is formed on each of the first surface and the second surface of the silicon substrate by wet thermal oxidation at 1,050 degrees centigrade for 75 minutes. Next, a chromium film with a thickness of 200 nanometers is formed on the silicon dioxide layer formed on the first surface by electron-beam vapor deposition. A positive photoresist is applied thereon, and a resist pattern in which patterns having a diameter of 2 micrometers are arranged at a pitch of 4 micrometers in two dimensions in an area of 60 millimeters square is formed by semi-conductor photolithography. Then, the exposed chromium film is etched by a chromium etching solution to expose the silicon dioxide layer. The exposed silicon dioxide layer is etched by a dry etching technique using $CHF_3$ plasma to expose silicon. The resist is removed using dimethylformamide, and the chromium is removed using a chromium etching solution.

Next, reactive ion etching is performed in Bosch process in which etching using a $SF_6$ gas by using silicon dioxide as a mask and deposition of a side-wall protection film by using a $C_4F_8$ gas are alternately performed. This reactive ion etching forms a recessed section with a depth of 160 micrometers. Thus, a silicon substrate is provided in which protruding silicon sections having a height of about 160 micrometers and a diameter of 2 micrometers are arranged at a pitch of 4 micrometers. The area of etching is 60 millimeters square, and the size of the recessed section is 60 millimeters square. In this example, this silicon substrate is used.

Next, the spaces between the protruding sections of the obtained silicon substrate are filled with metal (second process). The obtained silicon substrate is cleaned with a mixture of sulfuric acid and hydrogen peroxide, and after the cleaning, it is soaked in isopropyl alcohol and is then dried using a supercritical drier. Then, a silicon dioxide layer having a thickness of about 0.1 micrometers is formed on the surface of the silicon substrate by wet thermal oxidation at 1,050 degrees centigrade for 7 minutes. The silicon dioxide formed at the bottom of the recessed section of the silicon substrate is removed to form a silicon exposed surface. The partial removal of the silicon dioxide uses dry etching with $CHF_3$ plasma. This etching is highly anisotropic and advances in a direction substantially perpendicular to the silicon substrate. Therefore, even if the silicon dioxide at the bottom of the recessed section of the silicon substrate is completely removed, silicon dioxide at the sides of the protruding sections are left, and thus the silicon on the sides is not exposed. Next, chromium about 7.5 nanometers in thickness and copper about 50 nanometers in thickness are formed in this order by an electron-beam vapor deposition apparatus. Thus, metal composed of chromium and copper is formed on the exposed silicon at the bottom of the recessed section. Next, power is applied through the silicon substrate to fill the spaces between the protruding sections (recessed section) with gold by gold plating. The gold plating is performed at a plating solution temperature of 60 degrees centigrade and a current density of 0.2 A/dm$^2$ for 24 hours using a noncyanide gold plating solution (Microfab Au1101, Electroplating Engineers of Japan Ltd.). Thus, gold with a thickness of about 120 micrometers fills the spaces between the protruding sections.

Next, mask layers are formed (third process). A metal mask having an area of 56 millimeters square is placed at the center the area of 60 millimeters square in which the metal structure is formed by gold plating so as to be concentric with each other, and chromium about 5 nanometers in thickness and copper about 500 nanometers in thickness are deposited in this order using an electron-beam vapor deposition apparatus. When the metal mask is removed after the deposition, a metal film composed of chromium and copper is formed in an outer area including the periphery of the area in which the metal structure is formed. Similarly, a metal mask is placed on a position of the second surface opposing the center of the area in which the metal structure is formed so as to be concentric with each other, and chromium about 5 nanometers in thickness and copper about 500 nanometers in thickness are deposited in this order using the electron-beam vapor deposition apparatus. When the metal mask is removed after the deposition, a metal film composed of chromium and copper is formed also on a portion of the second surface opposing the metal film formed on the first surface. Next, the metal films are plated with copper. A copper plating solution set to the following composition is used:

Copper sulfate 5 hydrate: 200 (g/L)
98% concentrated sulfuric acid: 14 (mL/L)
35% hydrochloric acid: 0.09 (mL/L)
Cu-Brite VFII-A (Ebara-udylite Co., Ltd): 20 (mL/L)
Cu-Brite VFII-B (Ebara-udylite Co., Ltd) 1 (mL/L)

For copper plating, power is applied to the metal film composed of chromium and copper, formed by electron-beam vapor deposition to perform plating at a current density of 1.5 A/dm$^2$ at room temperature for one hour. Thus, a copper layer having a height of about 15 micrometers is formed. In this example, this is used as a mask layer for etching the silicon. Thus, silicon is exposed in an area of 56 millimeters square on the first surface and the second surface of the silicon substrate.

Next, the silicon in the areas exposed from the mask layers is etched (fourth process). The silicon substrate on which the mask layers are formed is soaked in a buffered hydrofluoric acid solution for 10 minutes to etch the silicon dioxide layers in the areas exposed from the mask layers on the first surface and the second surface of the silicon substrate to expose the silicon surface. The obtained silicon substrate is soaked in a potassium hydroxide solution heated to 95 degrees centigrade and set to 30 wt %, and the silicon of the areas exposed from the mask layers is etched from the first surface and the second surface. Performing the etching for three hours removes the silicon of the areas exposed from the mask layers, thus providing a structure in which a mesh-like metal structure formed of gold and having an area of about 55 millimeters square and a thickness of 120 micrometers is provided in the silicon substrate protected by the mask layers. The metal structure of this structure has holes arranged at a pitch of 4 micrometers in two dimensions. A determination whether silicon has been removed can be made by transmission observation using an optical microscope. Removal of the silicon can be confirmed by the transmission observation of the obtained structure that part of the metal structure is shielded from light and that the holes provided in the metal structure transmit light. Since the periphery of the metal structure is supported at a width of about 4 millimeters on the supporting member of the silicon substrate by the supporting portion of the silicon substrate and the mask layers, the obtained structure is not separated from the supporting member of the silicon substrate.

Next, the mask layers are removed using a copper etchant and a chromium etchant.

Since the periphery of the metal structure is supported at a width of about 4 millimeters on the silicon substrate even if the mask layers are removed, the structure is not separated from the silicon substrate. Observation of the structure from the first surface of the silicon substrate with an X-ray microscope shows that the metal structure blocks X-rays and that the holes in the metal structure allow X-rays to pass through.

Comparative Example 1

In this comparative example, a structure is manufactured in the same way as in

Example 1 except that mask layers are formed in areas other than the area of 60 millimeters square in which a metal structure is formed. When a silicon substrate is soaked in a potassium hydroxide solution heated to 95 degrees centigrade and set to 30 wt %, and the silicon of the areas exposed from the mask layers is etched for three hours, the supporting portion of the metal structure is removed, and thus the metal structure is separated from the silicon substrate.

Example 2

In Example 2, a two-dimensional structure is manufactured by forming mask layers from gold on the first surface and the second surface and performing etching using a hydrofluoric and nitric acid solution. The etching is performed only from the second surface, with the entire first surface masked, and is completed with silicon left in the holes of the metal structure. The silicon in the holes of the metal structure functions as a spacer.

The manufacturing method of this example will be described using FIGS. 3A to 3C. In this example, the process until the spaces between the protruding sections are filled with metal to form a metal structure (to the second process) is the same as that in Example 1 (FIG. 3A).

Next, mask layers 1004 (1004a and 1004b) are formed. A metal mask having an area of 56 millimeters square is disposed, centered on a position of a second surface 1011 of a silicon substrate 1001 opposing the center of the area of 60 millimeters square in which a metal structure 1003 is formed. Next, chromium about 5 nanometers in thickness and gold about 500 nanometers in thickness are deposited thereon in this order by an electron-beam vapor deposition apparatus. Then, chromium about 5 nanometers in thickness and gold about 500 nanometers in thickness are deposited in this order on the entire first surface 1010 of the silicon substrate 1001 by the electron-beam vapor deposition apparatus. Next, power is applied from the deposited gold surface to perform gold plating. The gold plating is performed at a plating solution temperature of 60 degrees centigrade and a current density of 0.2 A/dm$^2$ for 30 minutes using a non-cyanide gold plating solution (Microfab Au1101, Electroplating Engineers of Japan Ltd.) to form gold plated layers with a thickness of about 1.5 micrometers. In this example, they are used as the mask layers 1004 (FIG. 3B). By forming the mask layers 1004, an area 1005 exposed from the mask layer 1004b is formed only on the second surface 1011 of the silicon substrate 1001.

Next, the area 1005 of the silicon substrate 1001 exposed from the mask layer 1004b is etched. In this example, it is etched using a hydrofluoric and nitric acid solution. The silicon substrate 1001 on which the gold mask layers 1004 are formed is soaked in the hydrofluoric and nitric acid solution for 5 minutes to etch the area 1005 exposed from the mask layer 1004b. This allows the silicon with a depth of about 365 micrometers to be etched from the second surface 1011, and thus a structure in which the silicon in the holes 1002 of the metal structure 1003 is left is formed (FIG. 3C). Since the metal structure 1003 is supported on a supporting member 1009 by the mask layers 1004 and the portion of the silicon substrate 1001 which is not etched and thus remains (the silicon in the holes 1002 of the metal structure 1003 and a supporting portion 1007), the metal structure 1003 is not separated from the silicon substrate 1001. Observation of the structure from the first surface 1010 with an X-ray microscope shows that the holes in the metal structure 1003 allow X-rays to pass through, and that the metal structure 1003 blocks X-rays. The structure manufactured in this example decreases the amount of X-rays that pass through the holes as compared with the structure manufactured in Example 1 because the holes in the metal structure are silicon. However, this structure is higher in strength than the structure of Example 1 because the holes 1002 are specs. Therefore, the X-ray transmittance and strength of the holes (transmission area) 1002 may be balanced by suitably adjusting the amount of silicon in the holes to be etched (removed) depending on the size and application of the metal structure, and so on.

Example 3

In Example 3, a one-dimensional structure is manufactured by forming mask layers from nickel on a first surface and a second surface and by etching it with an alkalic solution. As in Example 2, the etching is performed only from the second surface, with the entire first surface masked, and the etching is completed, with silicon left between a plurality of metal structures in the silicon substrate. The remaining silicon functions as a spacer.

The method of manufacture of this example will be described using FIGS. 4A to 4E. In this example, a both-side mirror-finished silicon substrate 2001 with a diameter of 100 millimeters (4 inches) and a thickness of 300 micrometers is used.

First, a plurality of recessed sections 2002 are formed as follows (first process): A silicon dioxide layer having a thickness of about 0.5 micrometers is formed on each of a first surface 2010 and a second surface 2011 of the silicon wafer by wet thermal oxidation at 1,050 degrees centigrade for 75 minutes. Next, a chromium film having a thickness of 200 nanometers is formed on the silicon dioxide layer by electron-beam vapor deposition. A positive photoresist is applied thereon, and a resist pattern in which line and space are arranged at 5 micrometers/5 micrometers in one dimension in an area of 60 millimeters square is formed by semiconductor photolithography. Then, the exposed chromium film is etched by a chromium etching solution to expose the silicon dioxide layer. The exposed silicon dioxide layer is etched by a dry etching technique using CHF$_3$ plasma to expose silicon. The resist is removed using dimethyl-formamide, and the chromium is removed using the chromium etching solution described above.

Next, reactive ion etching is performed in Bosch process in which etching using a SF$_6$ gas by using the silicon dioxide layer as a mask and deposition of a side-wall protection film by using a C$_4$F$_8$ gas are alternately performed. This reactive ion etching forms a plurality of recessed sections 2002. The formed recessed sections 2002 each have a depth (height) of 160 micrometers (FIG. 4A). Thus, a silicon structure is provided in which the recessed sections 2002 with a depth of about 160 micrometers and an area of 60 millimeters by 5 micrometers are arranged at a pitch of 5 micrometers in the area of 60 millimeters square. In this example, this silicon substrate 2001 is used.

Next, the recessed sections 2002 of the obtained silicon substrate 2001 are filled with metal (second process). This process is the same as that of Example 1. First, the silicon substrate 2001 is cleaned with a mixture of sulfuric acid and hydrogen peroxide, and after the cleaning, it is soaked in isopropyl alcohol and is then dried using a super-critical drier. Then, a silicon dioxide layer having a thickness of about 0.1 micrometers is formed on the surface of the silicon substrate 2001 by wet thermal oxidation at 1,050 degrees centigrade for 7 minutes. The silicon dioxide layers formed at the bottoms of the recessed sections 2002 of the silicon substrate 2001 are removed to form a silicon surface. Next, chromium about 7.5 nanometers in thickness and copper about 50 nanometers in thickness are formed in this order using an electron-beam vapor deposition apparatus. Thus, metal composed of chromium and copper is formed on the exposed silicon at the bottoms of the exposed recessed sections 2002. Next, power is applied through the silicon substrate 2001 to fill the recessed sections 2002 with gold by gold plating. The gold plating is performed at a plating solution temperature of 60 degrees centigrade and a current density of 0.2 A/dm$^2$ for 24 hours using a noncyanide gold plating solution (Microfab Au1101, Electroplating Engineers of Japan Ltd.). Thus, a plurality of metal structures 2003 are formed. The metal structures 2003 each have a height of about 120 micrometers (FIG. 4B).

Next, mask layers 2004 (2004a and 2004b) are formed (third process). Chromium about 5 nanometers in thickness and copper about 1,000 nanometers in thickness are deposited in this order on each of the first surface 2010 and the second surface 2011 by the electron-beam vapor deposition apparatus. A positive photoresist is applied onto the deposited films, and a resist pattern in which an area having an opening with an area of 50 millimeters by 60 millimeters is formed in the second surface 2011 by semi-conductor photolithography. The center of the opening of the resist pattern is set at a position opposing the center of the area of the first surface 2010 in which the metal structures 2003 are formed. Thereafter, the exposed copper film is etched with a copper etchant, and the chromium film under the copper film is etched with a chromium etchant to expose the silicon dioxide layer. The exposed silicon dioxide layer is etched by a dry etching technique using CHF$_3$ plasma to expose the silicon. After the photoresist is removed, nickel is plated on the formed copper film. Performing the plating at a current density of 1.5 A/dm$^2$ and at room temperature for one hour forms a nickel layer with a height of about 15 micrometers. In this example, these are used as the mask layers 2004 for etching the silicon (FIG. 4C). Thus, the entire first surface 2010 is covered with the mask layer 2004a, and only the second surface 2011 is provided with an area 2005 exposed from mask layer 2004b. The exposed area 2005 has a size of 50 millimeters by 60 millimeters.

Next, the area 2005 of the silicon substrate 2001 exposed from the mask layer 2004b is etched (fourth process).

The obtained silicon substrate 2001 is soaked in a potassium hydroxide solution heated to 95 degrees centigrade and set to 30 wt % to etch the area 2005 exposed from the mask layer 4b. Performing the etching for 48 minutes causes the area 2005 exposed from the mask layer 2004b to be etched, thus forming a recessed section 2013 that forms a space having a depth of about 140 micrometers (FIG. 4D). Next, the mask layers 2004 are removed using a nickel etchant, a copper etchant, and a chromium etchant (FIG. 4E). Even if the mask layers 2004 are removed, the metal structures 2003 are not separated because the metal structures 2003 are supported in the silicon substrate 2001 by the supporting portion 2007 and the silicon left between the metal structures 2003. The metal structures 2003 maintain the interval of 5 micrometers with the silicon left between the metal structures 2003. Observation of the structure from the first surface 2010 with an X-ray microscope shows that the intervals between the metal structures 2003 allow X-rays to pass through and that the metal structures 2003 absorb X-rays.

Example 4

In Example 4, a structure is manufactured by the same way as that of Example 3 except that the first surface 2010 in Example 3 is also provided with the area of 50 millimeters by 60 millimeters exposed from the mask layer. This allows the area exposed from the mask layer to be formed on both of the first surface and the second surface and the silicon substrate to be etched from both surfaces. This allows the silicon between the metal structures to be removed, unlike Example 3, to form a plurality of spaces. The spaces form depressed spaces in the first surface. Observation of the obtained structure from the first surface with an X-ray microscope as in Example 1 shows that the metal structures allow X-rays to pass through and that the metal structures absorb X-rays.

When compared with Example 3, Example 4 is superior in that the amount of X-rays that pass between the metal structures is larger because the intervals between the metal structures are spaces. However, it is more difficult to maintain the intervals between the metal structures than Example 3 because there is no silicon between the metal structures. Therefore, the X-ray transmittance of the intervals (transmission areas) between the metal structures and the strength of the structure may be balanced by suitably adjusting the amount of silicon between the metal structures to be etched (removed) depending on the size and application of the metal structures, and so on.

Example 5

Example 5 is an example corresponding to the third embodiment, in which a resin layer is formed using a mold, with the metal structure deformed, so that a structure having a shape suitable as a shield grating for X-rays diverging in two dimensions from the point source is manufactured. Processes to the etching of the silicon substrate 1 masked with the mask layers 4 in the fourth process are performed as in Example 1 to form a mesh-like gold metal structure 3 with a thickness of 120 micrometers in the silicon substrate 1 protected by the mask layers 4 (FIG. 6A).

Next, the metal structure 3 is deformed by applying pressure to the metal structure 3, with the mold 19 in contact with the metal structure 3. In this example, a convex mold having a sag surface shape with a radius of 5 meters is used. When a surface-active solution is applied to the mold 19, and the metal structure 3 is placed on the mold 19, the metal structure 3 sticks to the mold 19 due to the surface tension of the surface-active solution and is deformed to a shape reflecting the shape of the mold 19 (FIG. 6B). Next, an ultraviolet cure resin is applied to the metal structure 3 on the mold 19, on which a quartz substrate to which a release agent is applied is placed and which is irradiated with ultraviolet rays to solidify the ultraviolet cure resin, thereby forming a resin layer 20. Thereafter, when the metal structure 3 in which the resin layer 20 is formed is released from the quartz substrate and the mold 19, the metal structure 3 having a shape taken along part of the surface of a ball with a radius of 5 meters is obtained. In other words, this structure has a continuous spherical curve with a radius of 5 meters (FIG. 6C). This allows the extensions of the holes of the metal structure 3 in the heightwise direction to focus on one point. However, since the ends of the metal structure 3 formed in the supporting portion are difficult to deform, the extensions of the holes at the ends do not intersect the point on which the foregoing extensions focus.

Example 6

Example 6 is an example corresponding to the fourth embodiment and differs from Example 5 in that the mask layers 4 are removed after the silicon substrate 1 is etched, and the other features are the same as Example 5. By performing the processes to the fourth process as in Example 5, the metal structure 3 supported by the supporting portion formed of a portion protected by the mask layers 4 of the silicon substrate 1 is obtained. Thereafter, the mask layers 4 are removed (FIG. 7A), and the metal structure 3 is deformed as in Example 5 (FIG. 7B). Next, an ultraviolet cure resin is applied to the metal structure 3 on the mold 19, on which a quartz substrate to which a release agent is applied is placed and which is irradiated with ultraviolet rays to harden the ultraviolet cure resin, thereby forming the resin layer 20. Thereafter, when the metal structure 3 to which the resin is applied is released from the quartz substrate and the mold 19, the metal structure 3 having a continuous spherical curve with a radius of 5 meters is obtained (FIG. 7C). This allows the extensions of the holes of the metal structure 3 in the heightwise direction to focus on one point. However, since the ends of the metal structure 3 formed in the supporting portion are difficult to deform, the extensions of the holes at the ends do not intersect the point on which the foregoing extensions focus.

Example 7

Example 7 is an example corresponding to the fifth embodiment, in which the metal structure 3 is deformed after being taken out from the silicon substrate 1, and then the resin layer 20 is formed. The processes are the same up to the second process in which the spaces between the protruding sections are filled with metal (FIG. 8A). Next, the silicon substrate 1 is soaked in a hydrofluoric acid and nitric acid solution to etch the silicon substrate 1, and the metal structure 3 is taken out from the silicon substrate 1 (FIG. 8B). Since the silicon of the protruding sections formed of silicon is etched, the holes in the metal structure 3 are formed into spaces. The aspect ratio of the holes is about 60. In this example, a convex mold 19 with a radius of 2 meters and having a sag surface shape is used. As in Example 5, a surface-active solution is applied to the mold 19, and the metal structure 3 is placed on the mold 19 and is deformed (FIG. 8C). Next, an ultraviolet cure resin is applied to the metal structure 3 on the mold 19, on which a quartz substrate to which a release agent is applied is placed and which is irradiated with ultraviolet rays to harden the ultraviolet cure resin (FIG. 8D). Thereafter, when the metal structure 3 in which the resin layer 20 is formed is released from the quartz substrate and the mold 19, the metal structure 3 having a continuous spherical curve with a radius of 2 meters is obtained (FIG. 8E). This allows the extensions of the holes of the metal structure 3 in the heightwise direction to focus on one point.

Example 8

Next, an image pickup apparatus in which the structure manufactured in one of the above-described embodiments or examples is used as an X-ray shield grating will be described using FIG. 10.

The image pickup apparatus 1000 of this example is an image pickup apparatus that uses X-ray Talbot interferometry. The image pickup apparatus 1000 includes an X-ray source 100 that emits spatially coherent X-rays, a diffraction grating 200 that diffracts X-rays, a shield grating 300 in which X-ray shield portions and transmitting portions are arranged, and a detector 400 that detects X-rays. The diffraction grating 200 diffracts X-rays to form an interference pattern. The shield grating 300 blocks part of the X-rays that form the interference pattern. The shield grating 300 is a structure manufactured in one of the above-described embodiments or examples.

When an object 500 is disposed between the X-ray source 100 and the diffraction grating 200, an interference pattern having information on the phase shift of X-rays due to the object 500 is formed. Moire is formed due to the interference pattern and the shield grating 300, and information on the moire is detected by the detector 400.

That is, this image pickup apparatus 1000 acquires an image of the object 500 by acquiring an image of the moire having phase information on the object 500. Performing phase retrieval using Fourier transform, phase shifting, or the like on the basis of the detection result allows a phase image of the object 500 to be acquired.

Although embodiments of the present invention have been described, the present invention is not limited to the foregoing embodiments, and various changes and modifications can be made within the spirit of the invention. The technical elements described in the specification or drawings offer technical advantages alone or in combination and are not limited to the combination described in the claims at the time of application. The techniques exemplified in this specification or the drawings achieve more than one purpose at the same time and have technical advantages by achieving one of the purposes.

This application claims the benefit of Japanese Patent Application No. 2011-166966, filed Jul. 29, 2011, and No. 2012-107876, filed May 9, 2012, which are hereby incorporated by reference herein in their entirety.

REFERENCE SIGNS LIST

1 Silicon substrate
2 Recessed section
3 Metal structure
4 Mask layer
5 Area exposed from mask layer
7 Supporting portion
9 Supporting member
10 First surface
11 Second surface
19 Mold
20 Resin layer

The invention claimed is:
1. A shield grating for an X-ray apparatus comprising;
   a metal structure in which a plurality of holes are arranged;
   a substrate supporting a peripheral area of the metal structure; and a resin layer having higher X-ray transmittance than the substrate, formed in at least part of each of the plurality of holes,
wherein the plurality of holes has an aspect ratio of 20 or more and
a thickness of a center area of the substrate corresponding to the metal structure is less than a thickness of a peripheral area of the substrate supporting the metal structure.

2. The shield grating for an X-ray apparatus according to claim 1, wherein the metal structure has a curved shape.

3. The shield grating for an X-ray apparatus according to claim 1, wherein the metal structure or the plurality of metal structures are formed of metal or an alloy thereof.

4. An X-ray apparatus comprising:
a diffraction grating configured to diffract X-rays emitted from an X-ray source;
the shield grating according to claim 1, the shield grating blocking part of the X-rays emitted from the diffraction grating; and
a detector configured to detect X-rays emitted from the shield grating.

5. The X-ray apparatus according to claim 4, wherein the apparatus is an image pickup apparatus using X-ray Talbot interferometry.

6. The structure according to claim 1, wherein the metal structure or the plurality of metal structures are formed of metal or an alloy thereof.

7. The shield grating for an X-ray apparatus according to claim 1, wherein the substrate is silicon.

8. A shield grating for an X-ray apparatus comprising:
a substrate; and
a plurality of metal structures arranged in a center area of a first surface of the substrate;
wherein the plurality of metal structures have spaces therebetween,
wherein the spaces form depressed spaces in the first surface of the substrate, and wherein the depressed spaces have an aspect ratio of 20 or more and
wherein in an area of a second surface of the substrate opposing the center area of the first surface, a recessed section that communicate with the spaces, is provided.

* * * * *